United States Patent [19]

Tsuda et al.

[11] Patent Number: 4,981,624

[45] Date of Patent: Jan. 1, 1991

[54] METHOD OF PRODUCING A VOLTAGE-NONLINEAR RESISTOR

[75] Inventors: Koichi Tsuda; Kazuo Mukae; Toyoshige Sakaguchi; Takashi Ishii, all of Kanagawa, Japan

[73] Assignee: Fuji Electric Co., Ltd., Kanagawa, Japan

[21] Appl. No.: 242,940

[22] Filed: Sep. 9, 1988

[30] Foreign Application Priority Data

Sep. 11, 1987 [JP] Japan ................................ 62-228093

[51] Int. Cl.[5] .............................................. C04B 33/32

[52] U.S. Cl. .......................................... 264/6; 264/61; 264/66

[58] Field of Search ................................ 264/61, 66, 6

[56] References Cited

U.S. PATENT DOCUMENTS 4,094,061 6/1978 Gupta et al. .......................... 264/66
4,169,071 9/1979 Eda et al. ............................ 252/517
4,397,773 8/1983 May ...................................... 264/66

FOREIGN PATENT DOCUMENTS 56-11203 3/1981 Japan .

*Primary Examiner*—James Derrington
*Attorney, Agent, or Firm*—Finnegan, Henderson, Farabow, Garrett and Dunner

[57] ABSTRACT

A method of producing a voltage nonlinear ZnO varistor in which seed grains of ZnO are produced by spray drying a slurry of ZnO particles and then sintering the dried slurry to form seed grains having a size of 10 to 100μm. The seed grains are mixed with a ZnO powder of particles of much smaller size than the seed grains and a small amount of an auxiliary component. The mixture is then molded and sintered to form the varistor element to which electrodes are attached.

8 Claims, 3 Drawing Sheets

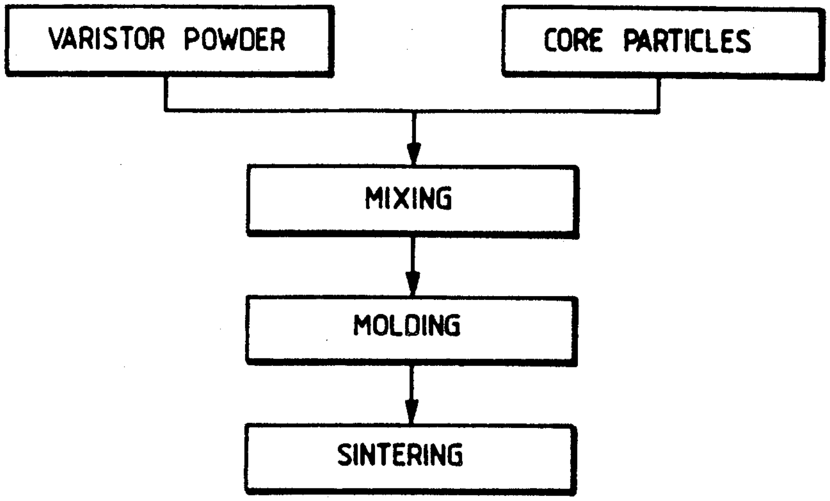
FIG. 1 PRIOR ART
FIG. 2 (a) PRIOR ART
FIG. 2(b) PRIOR ART
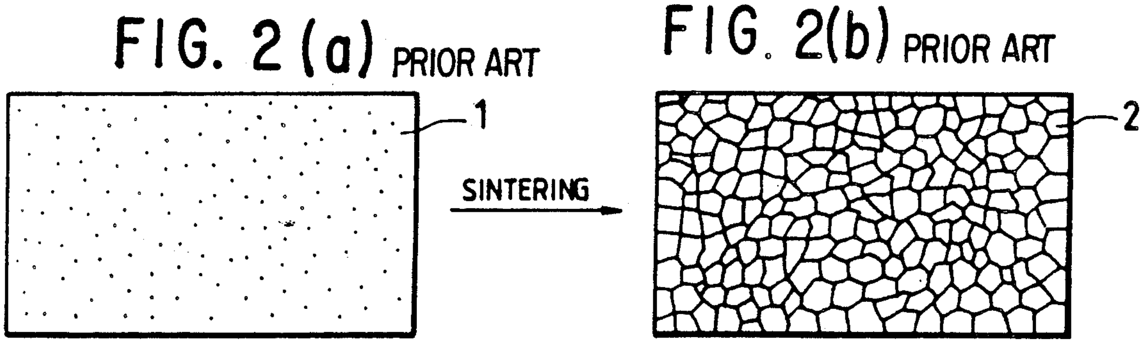
FIG. 3(a) PRIOR ART
FIG. 3(b) PRIOR ART
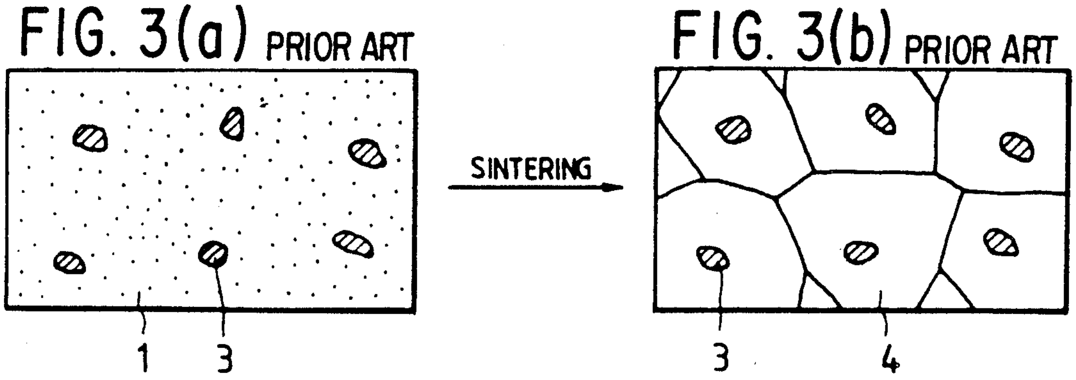

METHOD OF PRODUCING A VOLTAGE-NONLINEAR RESISTOR

FIELD OF THE INVENTION

The present invention relates in general to a method of producing a voltage-nonlinear resistance element (resistor), for example, a varistor. In particular, it relates to a fabrication method for a varistor for a low-voltage circuit having zinc oxide (ZnO) as its principal component.

BACKGROUND OF THE INVENTION

Ceramics produced by sintering a mixture principally consisting of ZnO with an amount of additive added thereto is known to show a superior voltage nonlinearity. Therefore, this mixture has been widely used in the industry for varistors for controlling an abnormal voltage (surge) in electric circuits.

The voltage nonlinearity of a ZnO varistor is due to a Schottky barrier formed on grain boundaries of the ZnO grains. In a practical varistor, its varistor voltage per layer of grain boundaries formed by combining the ZnO grains is almost constant independent of the crystal particle size. The value of the varistor voltage is about 2 volts per layer of grain boundaries. The varistor voltage is defined as the voltage across its terminals when a current of 1 mA is caused to flow into a varistor and its level is usually expressed as $V_{1mA}$. The varistor voltage of a voltage-nonlinear resistor is therefore determined by the number of grain boundary layers existing between electrodes which are placed on a sintered body of ZnO. If the voltage-nonlinear resistor to be used for a low-voltage circuit, it is necessary to make the thickness of the element thin or to make the ZnO grain size sufficiently large.

For example, when used for a 12 V DC circuit, generally, a ZnO varistor having a varistor voltage of 22 V is used in view of fluctuations of the circuit voltage. In this case, however, the varistor can have only 11 layers of grain boundaries existing between its terminal electrodes of the resistive element since the varistor voltage per layer of grain boundary is about 2 V as described above.

On the other hand, a usual fabrication method produces a ZnO sintered body of the varistor with a grain size of 10–20 μm. It is therefore necessary to select the thickness of the element to be 0.1–0.2 mm in order to obtain the varistor voltage of about 22 V. However, a sintered body for such a ZnO varistor of 0.1–0.2 mm thickness has low mechanical strength, which thereby causes a problem in that a crack may be generated in production of the sintered body or the like. Accordingly, such a method which relies on the thinness of the element is not practical.

In order to solve the problem, there has been disclosed in Japanese Patent Examined Publication No. 56-11203 a skillful method in which a small amount of ZnO single crystals of much larger grain size than that of raw material ZnO powder is added to the ZnO powder so that grain growth is accelerated with the ZnO single crystals acting as seeds (hereinafter referred to as "seed grains"). FIG. 1 shows a basic process flow of this method. The method comprises the steps of mixing the varistor powder and the seed grains molding the mixture, and then sintering the molded mixture.

When the mixture of seed grains and varistor powder is sintered, grain growth is accelerated with the seed grains as crystal growth seeds because of the difference in surface, energy. As a result, extremely larger crystal grains can be obtained in comparison with those in the case of addition of no seed grains. FIG. 2 is a diagram typically illustrating such a situation. In FIG. 2 are shown a raw material powder 1, and crystal grains 2 in the sintered body. FIG. 2 shows a situation in a conventional method in which no seed grains are added. In this situation, the grain size is 50 μm at the largest even if the sintering temperature is made high or the sintering time is prolonged. If sintering is thus made at a high temperature and for a long time, a nonlinear voltage coefficient $\alpha$ of the element is extremely lowered because of evaporation of the additive and so on so that the element is not suitable for practical use. On the other hand, FIG. 3 is a diagram typically illustrating a situation in the case where seed grains are added. Each crystal grain, grows from a seed grain 3 into a giant grain 4. According to this method, each crystal grain 4 grows to 100–200 μm in its size so that it is possible to lower its varistor voltage per mm of element thickness to 20 V/mm or less.

In order to produce seed grains used for accelerating grain growth, the following methods are generally used. (1) After molding a mixture of powder in which a small amount of a Ba or Sr compound is added to the ZnO powder, the molded mixture is sintered and the thus obtained sintered body is hydrolyzed. (2) After molding a mixture of powder in which a grain growth accelerator such as $Bi_2O_3$, a rare earth compound or the like is added to the ZnO powder, the molded mixture is sintered and the thus obtained sintered body is ground. (3) ZnO single crystals are directly formed by using a vapor-phase epitaxial method.

Of the above seed grain production methods, the first method (1) has been most often used because the Ba or Sr compound used as a grain growth accelerator can be removed by hydrolysis, and the additive and the seed grain size can be easily controlled. FIG. 4 shows a process flow chart of a prior art ZnO varistor production method incorporating this seed grain production process. It will be apparent from FIG. 4 that the seed grain production process require many steps.

There are however the following problems in the ZnO varistor production method including the above-mentioned prior art seed grain production process. Therefore, it has not always been a satisfactory method because of variations in product characteristics, in production, cost, and so on.

Since the seed grains are not spherical in shape, the seed grains are not equal in grain size after sintering and variations occur in electrical characteristics.

Because of large variations in the seed grain size, the yield of usable seed grains is small.

Much time is spent for the hydrolysis step in making the sintered body into single crystals.

Lastly, it is necessary to provide a separate line for producing the seed grains.

SUMMARY OF THE INVENTION

The present invention has been attained taking into consideration the foregoing problems in the prior art methods of producing a voltage-nonlinear resistor including the above-mentioned seed grain production process.

Accordingly, an object of the present invention is to provide a method of producing a voltage-nonlinear resistance element, for example, a low-voltage ZnO varistor, in which variations in element characteristics can be reduced and which includes an improved process for producing seed grains to thereby simplify the method.

The invention can be summarized as a method of producing a voltage-nonlinear resistive element in which large seed grains are formed by spray drying a slurry of a crystal growing initiating material. The dried material is sintered to form the large seed grains. The seed grains are added to a mixture of a powder of ZnO of much-small grain size and another material, which mixture would produce a voltage nonlinearity after sintering. The seed grains and the mixture are molded and then sintered and electrodes are attached.

BRIEF DESCRIPTION OF THE DRAWINGS

FIG. 1 is a process flow chart for producing a low voltage ZnO varistor in which basic seed grains are added according to the prior art.

FIG. 2 is a diagram showing ZnO varistor crystal particles without adding any seed grains.

FIG. 3 is a diagram showing ZnO varistor crystal grains when seed grains are added.

DETAILED DESCRIPTION OF THE PREFERRED EMBODIMENTS

As the result of investigation on the method of producing a ZnO varistor using the seed grain production process, the applicants have given attention to the facts (1) that granulated powder of spherical particle shape can be obtained if a slurry made of ZnO varistor raw material powder, which is a thoroughly wet mixture, is dried by a spray dryer, (2) that the size of the granulated powder is in a range of from about 10 to 100 μm and can be advantageously controlled, and (3) that the granulated powder is converted by sintering to single crystal grains or polycrystalline grains composed of several crystals and the thus obtained grains can be used as seed grains. The inventors have found that if a mixture of the thus prepared seed grains and ZnO varistor powder is sintered, a low-voltage ZnO varistor can be provided by a method in which variations in resistor characteristics can be reduced and in which the number of production steps are significantly reduced in comparison with the conventional method. The present invention has thus been accomplished.

According to the present invention, the method of producing a voltage-nonlinear resistor starts with mixing a powder in which a small amount of an auxiliary component is added to the principal component of zinc oxide powder. The zinc oxide powder shows a voltage-nonlinearity after being sintered with single crystals or polycrystals of zinc oxide having a sufficiently larger grain size than that of the zinc oxide powder. The mixture is then molded and then the molded mixture is sintered. The method of the invention is characterized in that the single crystals or polycrystals of zinc oxide are prepared by sintering granulated powder obtained from a slurry of the zinc oxide powder by a spray-drying method.

The present invention provides a method of producing a voltage nonlinear resistor by mixing, forming and sintering powder in which a very small amount of an auxiliary component is added zinc oxide powder as a principal component. The zinc oxide powder shows a voltage nonlinearity after sintering. The mixture also contains single crystals or polycrystals of zinc oxide having significantly larger grain size than that of the zinc oxide powder. The invention is characterized in that the single crystals or the polycrystals of the zinc oxide are made by sintering granulated powder obtained from a slurry of the zinc oxide powder by a spray-drying method.

Figure 4:
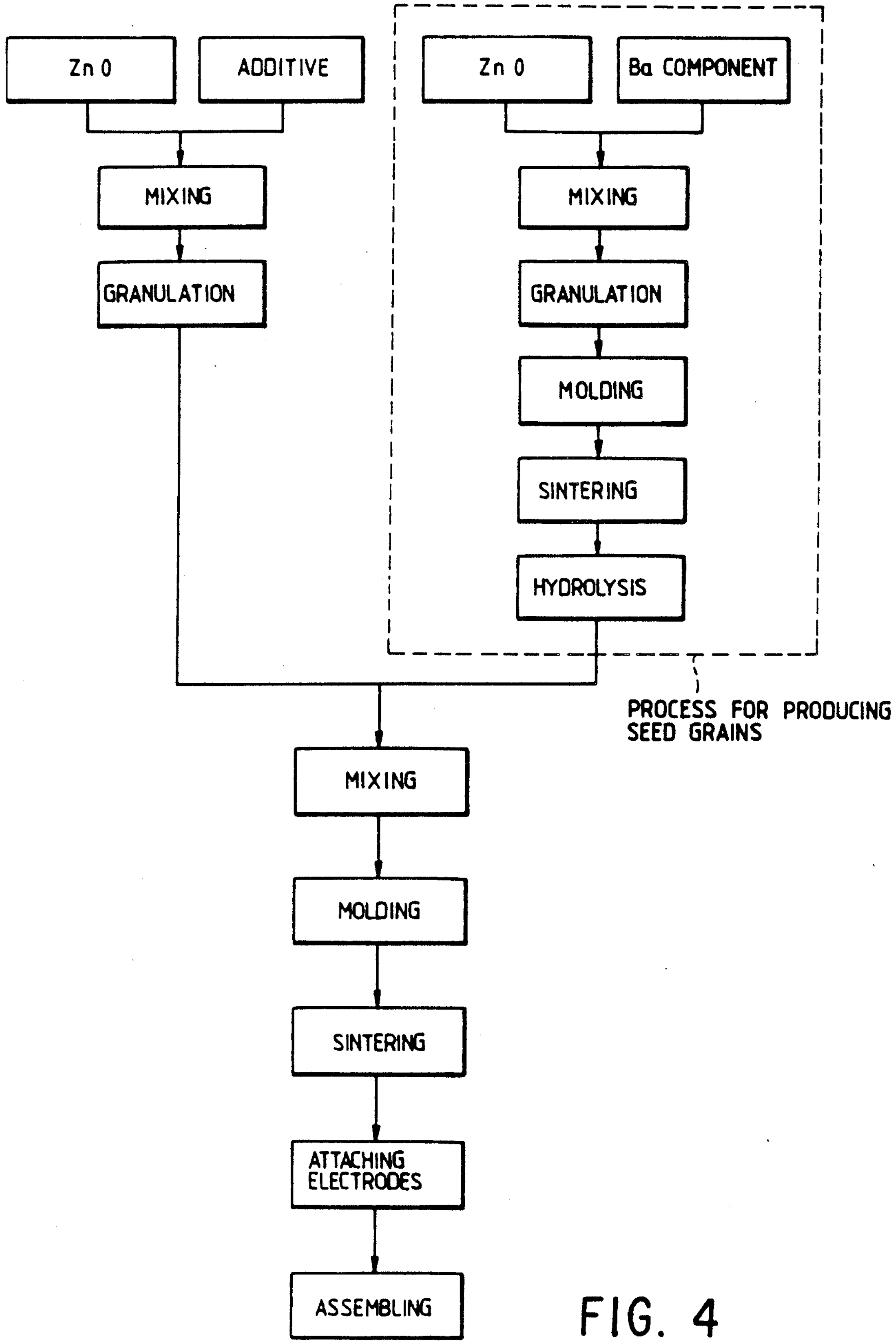
FIG. 4 is a process flow chart for producing the ZnO varistor according to the prior art.
Figure 5:
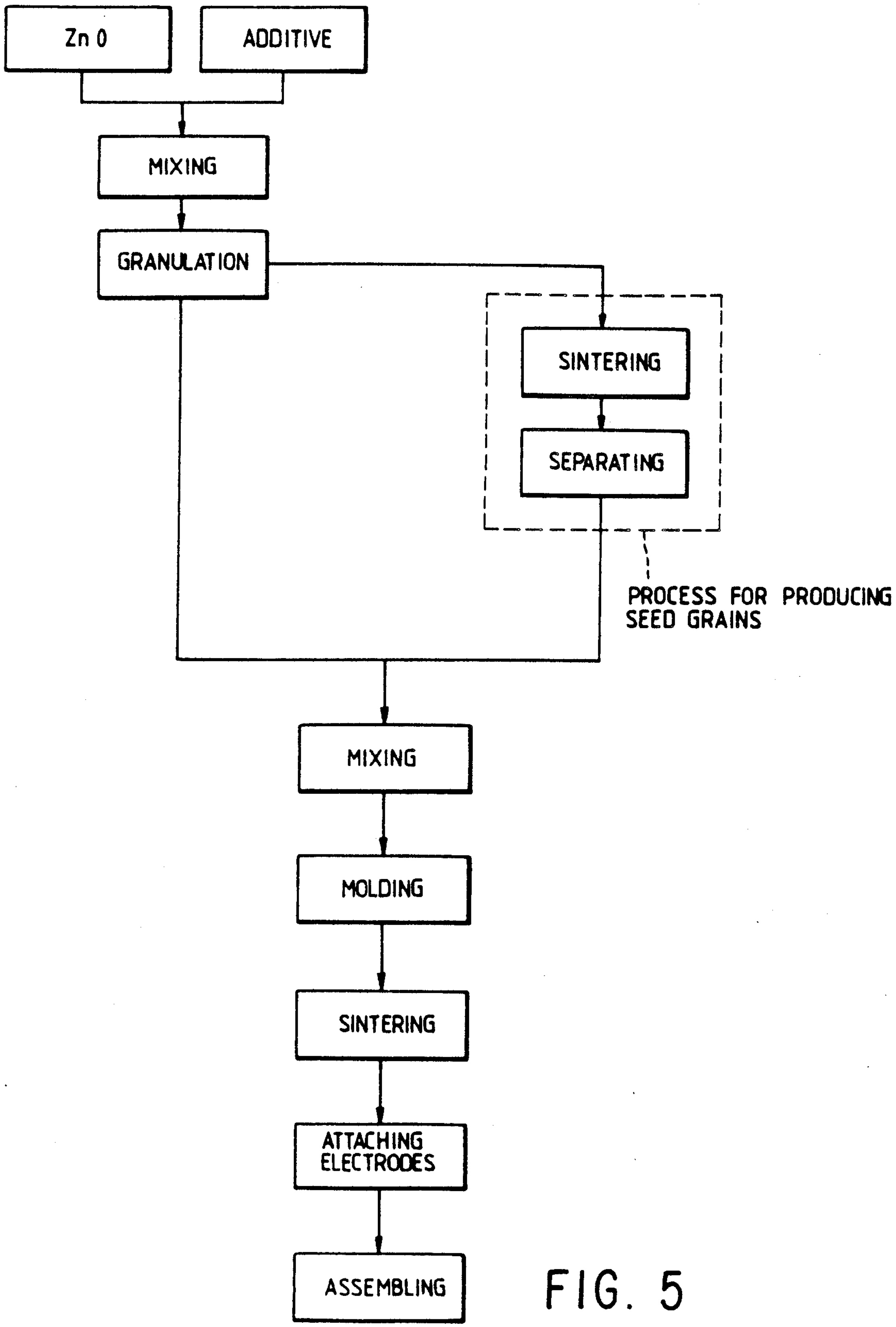
FIG. 5 is a flow chart showing a ZnO varistor production process according to the present invention.

FIG. 5 shows a process flow chart of the method of producing a voltage nonlinear resistance element according to the present invention. Referring to FIG. 5, an embodiment of the method of producing a low voltage ZnO varistor according to the present invention will now be described.

In the method of the present invention, ZnO varistor powder which may show voltage nonlinearity after being sintered is first prepared. This powder is obtained by adding a suitable amount of an auxiliary component to ZnO powder. The auxiliary component may be, for example, an oxide of Pr, Co, B, Bi, Mn, Sb, Cr or the like, or a precursor compound of a carbonate, nitrate, hydrate or the like of one of the above metals which can produce an oxide when sintered. For example, the precursor compound may be $Pr_6O_{11}$, $Co_2O_3$, $Co_3O_4$, $B_2O_3$, $Bi_2O_3$, $MnO_2$, $Sb_2O_3$, $Cr_2O_3$, or the like. Next, this raw material powder is adequately mixed by means of a wet ballmill or the like, ground into slurry, and then granulated by means of a spray dryer. Each particle of the thus obtained granulated powder has a substantially perfect spherical shape with a size of about 10–100 μm. It is possible to selectively control the particle size of the granulated powder by changing the granulation conditions. The granulated powder may be made of a composition different from that of the ZnO varistor. The production method using such a different powder can be considered as a modification of the present invention. Such a modification may be used on the basis of judgment as to whether or nor the seed grains of the differing composition made by the method of the present invention may have the same satisfactory characteristics as seed grains of the same composition as that of the ZnO varistor.

The thus prepared granulated powder is put into an alumina porcelain crucible so as to be sintered at 1100°–1500° C. preferably at 1200°–1400° C. The sintering proceeds for 1–7 hours, preferably for 3–5 hours. The granulated powder shrinks by about 20% during sintering so as to become sintered particles. Although adjacent sintered particles are sintered with each other at contacting portions therebetween so as to form neck portions, the sintered particles may be separated from each other at the neck portion into completely separated particles if they are loosened by an application of slight pressure. From an inspection through an electron microscope, it is found that the sintered particles are single-crystal grains and/or polycrystalline grains composed of two or three crystals. The percentage of the single-crystal particles is about 70% or more and the percentage of the polycrystal grains is about 30% or less.

Next, the thus prepared single-crystal or polycrystalline grains, acting as the seed grains, are adequately mixed with the above-mentioned ZnO varistor granulated powder at a desired rate by, for example, a V-type mixer. The mixture is molded into a predetermined shape by means of a die. Then, the molding is sintered in the atmosphere at 1100°–1500° C., preferably at 1200°-1400° C. for several hours. The molding is shrunk by about 20% through sintering. Electrodes are attached on the thus prepared sintered body so as to complete a ZnO varistor.

According to the present invention, a slurry made of ZnO varistor raw material powder by wet-mixing is dried through a spray-drying method so as to obtain granulated powder in which each particle is spherical and has a desiredly controllable size of about 10–100 μm. The granulated powder is sintered to thereby obtain sintered particles of single crystals or at most of polycrystals each composed of several single crystals.

These single-crystal grains or polycrystalline grains as seed grains are mixed with the ZnO varistor powder, and then the mixture is sintered so as to make the grains grow. The grain growth occurs uniformly so that a ZnO varistor which shows less variation of resistive characteristics can be obtained.

Further, the number of steps in the process for producing the above-mentioned seed grains significantly reduced over the steps in the conventional method so that the production cost of a ZnO varistor can be greatly reduce.

The present invention will now be described with an example.

First, a raw material was prepared by adding a suitable amount of a compound such as an oxide or the like of Pr, Co, B or the like to the ZnO powder. The raw material was sufficiently mixed by a wet ballmill. After the mixture was ground, granulated powder was obtained by use of a spray dryer. Each particle of the thus obtained granulated powder was substantially perfectly spherical and had a particle size of 30–50 μm. The granulated powder was put into an almina porcelain crucible without applying pressure and was sintered in the atmosphere at 1350° C. for 4 hours. By the sintering, the granulated powder shrunk by about 20% while turning into sintered particles having a diameter of 25–40 μm. Although those sintered particles were sintered together at contacting points therebetween to thereby form neck portions they can be loosened by application of slight pressure so that they are separated from the neck portions into completely separated single particles. From the inspection through an electron microscope, these sintered particles were single crystals or particles composed of two or three single crystals. The percentages of the single crystals and polycrystals were about 70% and about 30% respectively.

The thus formed seed grains were sufficiently mixed with the above-mentioned ZnO varistor granulated powder by a V-type mixer. Then, the mixture was molded into a molding shaped like a disc having a thickness 1.5 mm by use of a die having a diameter of 17 mm. Next, the molding was sintered in the atmosphere at 1350° C. for 4 hours. The size of the obtained sintered body is 14 mm in diameter and 1.2 mm in thickness.

After the thus obtained sintered body was ground to a thickness of 1 mm, ohmic contact electrodes having a diameter of 11.5 mm were provided on the opposite surfaces of the sintered body to thereby form a varistor, and its varistor characteristics were measured.

The obtained results are shown in Table 1. Table 1 shows a varistor voltage $V_{1mA}$, a coefficient of variation of $V_{1mA}$ a voltage nonlinear coefficient $\alpha$ in a range of current from 1 to 10 mA, and a 2 ms surge withstanding capability. The surge withstanding capability was defined as the current at which the rate of change of $V_{1mA}$ was ±10% after a 2 ms rectangular current pulse had been made to flow into the element 20 times at intervals of 20 seconds. Table 1 also shows the electric characteristics produced by the conventional method for comparison. It is clearly recognized that the sintered body obtained by the method according to the present invention is superior in uniformity so that the coefficient of variation of $V_{1mA}$ and the surge withstanding capability are improved in comparison with the varistor produced by conventional method.

TABLE 1

| | present invention | conventional method |
|---|---|---|
| $V_{1mA}$ (V/mm) | 17.5 | 17.5 |
| Variation (%) | 1.2 | 5.4 |
| coefficient $\alpha$ | 32 | 30 |
| Surge withstand capability (A) | 255 | 180 |

According to the present invention, a slurry made of ZnO varistor raw material powder is prepared by wet-mixing. The slurry is made into granulated powder by spray drying. The granulated powder is sintered to obtain single crystal particles or polycrystalline particles composed of two or three crystals. A ZnO varistor production method includes the step of adding the thus obtained ZnO sintered particles as seed grains to a ZnO powder. The method provides a ZnO varistor in which variations of characteristics are reduced and in which the characteristics are improved in comparison with those produced by the conventional method. The method of the invention greatly reduces the number of production steps to thereby greatly reduce the cost.

What is claimed is:

1. A method of producing a voltage-nonlinear resistance element, comprising the steps of:
   - preparing a slurry of a powder of a first material;
   - spray drying said slurry to obtain granules that are at least partially crystalline;
   - sintering said granules to form sintered particles;
   - separating said sintered particles from each other to produce seed grains;
   - preparing a second powder containing particles of zinc oxide powder as a principal constituent and a lesser amount of auxiliary component;
   - mixing together said seed grains and said second powder to produce a mixture, the size of said seed grains being substantially larger than the size of the zinc oxide particles of said second powder;
   - molding said mixture to produce a molded mass;
   - sintering said molded mass to produce a resistance element, the voltage of the element varying as a decreasing function of the size of the seed grains.

2. A method as recited in claim 1, wherein said auxiliary component comprises either an oxide of an element chosen from the group consisting of Pr, Co, B, Bi, Mn, Sb and Cr or a precursor of carbonates, nitrates and hydrates of said element.

3. A method as recited in claim 1, wherein particles of said first material comprises zinc oxide.

4. A method as recited in claim 3, wherein said step of sintering said granuals comprises heating said granuals to a temperature in a range of 1100° to 1500° C.

5. A method as recited in claim 4, wherein said temperature is in a range of 1200° to 1400° C.

6. A method as recited in claim 1, further comprising the step of pressing said sintered particles.

7. A method as recited in claim 1, wherein said seed grains have a diameter in a range of 10 to 100 μm.

8. A method as recited in claim 1, wherein said first slurry further contains said auxiliary component.

* * * * *